United States Patent
Steinkraus

(10) Patent No.: US 8,327,702 B2
(45) Date of Patent: Dec. 11, 2012

(54) ADJUSTABLE MEASURING DEVICE

(75) Inventor: William Steinkraus, New York, NY (US)

(73) Assignees: William Steinkraus, New York, NY (US); Dongyun Kyle Hahn, New York, NY (US)

( * ) Notice: Subject to any disclaimer, the term of this patent is extended or adjusted under 35 U.S.C. 154(b) by 98 days.

(21) Appl. No.: 13/102,628

(22) Filed: May 6, 2011

(65) Prior Publication Data

US 2012/0279297 A1    Nov. 8, 2012

(51) Int. Cl.
*G01F 19/00* (2006.01)

(52) U.S. Cl. ............................................ 73/426; 73/429

(58) Field of Classification Search ................... 73/426, 73/429

See application file for complete search history.

(56) References Cited

U.S. PATENT DOCUMENTS

| | | |
|---|---|---|
| 2,165,642 A | 7/1939 | Mayer |
| 2,521,343 A | 9/1950 | Chadwick |
| 2,630,014 A | 3/1953 | Chester |
| 3,416,375 A | 12/1968 | Lubman et al. |
| 5,182,948 A | 2/1993 | Robbins et al. |
| D371,976 S | 7/1996 | Tucker |
| D452,177 S | 12/2001 | McGuyer |
| D466,034 S | 11/2002 | McGuyer |
| 7,086,282 B2 | 8/2006 | Kilduff et al. |
| 2005/0160807 A1 | 7/2005 | Kilduff et al. |

*Primary Examiner* — Lisa Caputo
*Assistant Examiner* — Jamel Williams
(74) *Attorney, Agent, or Firm* — Vidas, Arrett & Steinkraus P.A.

(57) ABSTRACT

An adjustable measuring device that includes a container with a channel and a mating slider in the container. The slider is magnetically attached. Portion(s) not filled by the slider provide define at least one measuring chamber of variable volume depending on the positioning of the slider in the channel. Also, in an adjustable measuring device using a mating slider, measurement lines can be formed of elastomeric polymer to facilitate sealing.

15 Claims, 1 Drawing Sheet

ADJUSTABLE MEASURING DEVICE

BACKGROUND OF THE INVENTION

A variety of adjustable measuring spoons or cups are known. Examples include those described in U.S. Pat. No. 2,165,642, U.S. Pat. No. 2,630,014, U.S. Pat. No. 5,182,948, US 2005/0160807. Such devices provide a cook or baker with a single device for measuring solid particulate substances as salt, flour, sugar, spices and the like, with reasonable accuracy, but are much less suited to liquid measure, such as water, oil, vinegar, etc. This is because liquid often can get behind the movable dam or wall of the device.

The known devices also include complex shapes which makes cleaning difficult and/or which requires that relatively thin plastic parts be unsnapped for disassembly and cleaning, stressing relatively thin plastic parts which can easily break or become loose as a result.

SUMMARY OF THE INVENTION

The present invention in some aspects provides an adjustable measuring device which provides a simpler construction and easier cleaning. In some further aspects the present invention provides an adjustable measuring device which provides a sealing engagement of the movable parts sufficient to allow use with low viscosity liquids.

In some aspects the invention is an adjustable measuring device comprising:

an open container defining a volume and including a channel having an elongated wall of a length L1 comprising at least a portion of the volume of the container; and a slider mating with the shape of the channel and having a length L2 shorter than L1 so that the slider can be positioned at multiple locations in the channel to define at least one measuring chamber of variable volume depending on the positioning of the slider in the channel, the slider and container channel being magnetically attractive to each other so that the slider attaches to the container to form a measuring assembly when the slider is fitted into the channel at one of said multiple locations, and the measuring assembly being separable for cleaning by pulling the slider from the container channel.

In some embodiments measurement markings may be provided of an overmolded elastomeric material that sealingly engages the slider, for instance an elastomeric silicone.

DETAILED DESCRIPTION OF THE INVENTION

The present invention provides several significant advantages over prior adjustable measuring devices. It utilizes a simple two part device comprising a container channel and a mating slider that fits closely in the channel. The container channel and slider attach magnetically, so there is no need for snap fit. The magnetic attachment allows for very close mating, easy separation and adaptability to a wide variety of ornamental configurations. The magnetic attachment also simplifies the disassembly for cleaning and reassembly for use or storage. In storage the magnetic attraction reliably holds the parts together so they do not become separated in a drawer or the like, but it also allows very easy repositioning at the desired volume.

Figure 1:
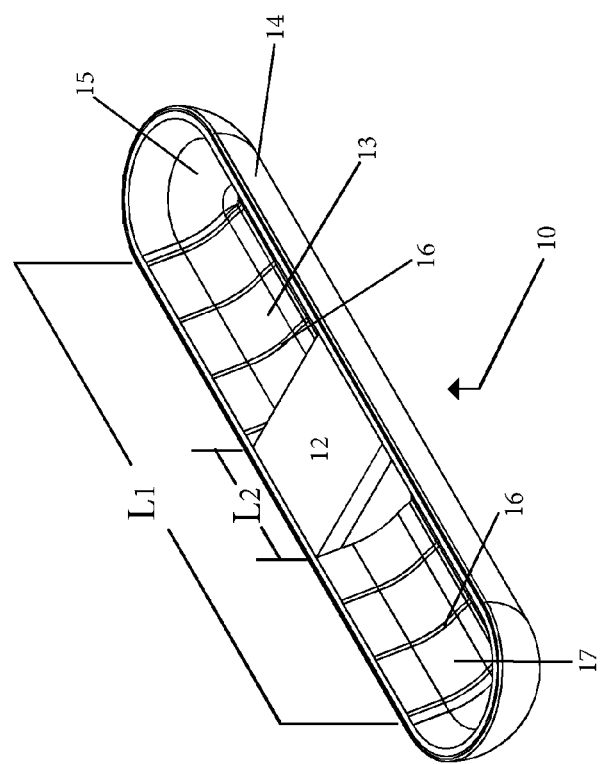
FIG. 1 is a perspective view of an embodiment of adjustable measuring device of the invention.

Referring to FIG. 1 there is shown an assembled measuring device 10 of the invention. Device 10 comprises two parts, container 14 and slider 12. The two parts are magnetically attracted to each other and separable simply by pulling the slider out of the container channel.

Container 14 is has a fixed volume and includes an elongated channel 13 having a length L1. The slider 12 matingly fits in channel 13 and has a length L2, shorter than L1, which allows the slider to be positioned at multiple locations in the channel.

Marker lines 16 provide the gradations of volume measurement. This may be for instance be single or multiple system volumes such as fractional teaspoon, and teaspoon, fraction tablespoon and tablespoon, ounces, fractional cups and cup(s), pints or quarts and the like, or Metric system units such as volume in milliliter, deciliter, or liter units. Several different systems may be combined such as tablespoon and teaspoon. Other size indicia, not shown, may be provided in the chamber wall, for instance by print or molding, to indicate the specific volume marked by each line 16.

In the device 10, the location of the slider 10 defines two possible measuring chambers, 15 and 17. The device can be manufactured so that the markings are the same or different between the two chambers.

Alternatively the device may be configured so only one chamber is used for measurement. The measurement chamber may be indicated for instance by the reading orientation of the size indicia. In another embodiment, not shown, the slider may include a cover on the top of one of the chambers 15 or 17 when it is in minimum volume location so that only the uncovered chamber is used for measurement.

In at least one embodiment, one of the chambers 15 or 17 may be provided with indicia marking a different volume system from the other. For instance teaspoon, ½ teaspoon, and ¼ teaspoon may be provided on one side and tablespoon, ½ tablespoon provided on the other. In another embodiment English system volumes may be provided on one side and the Metric system volumes on the other. The marker lines for the two systems may be distinguished for instance by different colors if they overlap at any point along the length of the container 14.

Figure 2:
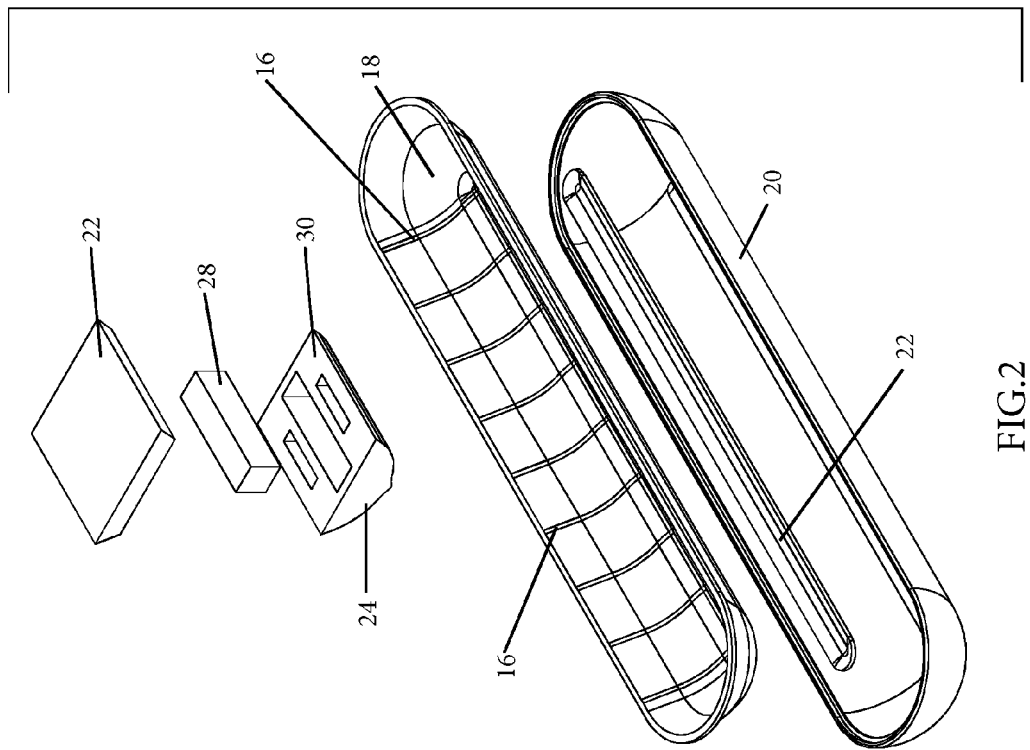
FIG. 2 is an exploded parts view of the device of FIG. 1.

Referring to FIG. 2 there is shown an exploded view of the elements combined to form the respective parts 12 and 14 of the device 10. Container 14 is formed with inner and outer walls 18 and 20, and a ferromagnetic rod 22 which is assembled in a fixed position between the inner and outer wall.

Rod 22 may be a magnet but preferably is non-magnetized metal that is attracted to magnets. Many grades of stainless steel may be suitable as is or after cold working. Steel, iron, nickel or the like may also be used.

In some embodiments the marker lines 16 may be flush or recessed in the inner wall 18. In the embodiment shown in FIGS. 1 and 2, however, the marker lines are overmolded onto the inner wall 18, suitably of elastomeric polymer such as a curable silicone that cures to a soft elastomer when molded. The overmolded lines 16 may be raised slightly from the inner wall 18, for instance about 0.01 mm-1 mm. This allows the slider 12 to engage the marker lines in a sealing manner effective to hold even low viscosity liquids such as water, milk, oils and the like.

For assembly, the rod 18 is fitted between the outer wall 10 and the inner wall 18 which already is provided with the lines 16 overmolded therein. The inner and outer walls are then fixedly joined, for instance by fusion welding or with an adhesive, to form the container 14 as a single part of device 10.

The slider 12 may have a three-piece construction comprising slider bottom 24, slider lid 26, and magnet 28. The magnet 28 is fitted into an internal chamber 30 of the slider bottom 24 and then the lid is fixedly joined, for instance by fusion welding or with an adhesive, to form the slider 12 as a single part of device 10.

In the embodiment of FIGS. 1 and 2, the measuring chambers have a minimum volume which is defined by the portion of the interior volume that extends beyond the ends of the channel 13. This is an optional feature. In other embodiments the 14, so that when the slider is advanced to the end of a channel, one of the measuring chambers 15 or 17 is effectively channel 13 defines the entire volume of the container closed. In still other embodiments the slider ends may have curvature that adds or subtracts to the minimum volume of the embodiment shown in the Figures.

In some embodiments the slider can be located at any desired volume at, or between, predetermined marked volumes. In other embodiments the device may be provided with slot and protrusions that limit the slider to mating with the chamber at predetermined locations.

The device is suited to manufacture from thermoplastic or thermoset plastics together with at least one magnet, embedded or assembled within one or both of the parts, and either a second magnet or ferromagnetic material embedded or assembled within the other.

Exemplary thermoplastic materials include polyolefins, such as polyethylene (e.g. high density polyethylene, medium density polyethylene or low density polyethylene), polypropylene or copolymers of either of these with each other or with other monomers having olefinic unsaturation; polysulfone; poly(meth)acrylates; thermoplastic polyurethanes; aliphatic or aromatic polyesters and copolymers thereof, for instance PET, PBT, Hytrel® polyester-block-polyether copolymers and the like; polyamides and polyamide copolymers, for instance nylons such as nylon 6, nylon 6/6, nylon 12, Pebax® polyamide-block-polyethers, and the like. Preferred thermoplastic materials are nylon polymers, which have good durability in kitchen devices and can be overmolded with silicones.

Exemplary thermoset plastic materials include curable acrylic, epoxy, melamine, silicone and urethane materials. Cure systems may be initiated by heat, light (e.g. UV curing), mixing of two parts or by moisture.

In the case that one uses magnets for both the element 28 and the rod 18 it may be advantageous to use a rod 18 that has a similar or shorter length than the element 28 and provide room between the inner and outer walls of container 14 to allow the magnetic rod 18 to slide longitudinally therein. The opposite poles of the two magnets will attract strongly and then the magnetic rod 18 can side within the walls of container 14 as the slider 10 is slid in the channel 13 to a desired position.

In some embodiments magnetic stainless steel, for instance a cold worked 300 series stainless steel, may be used for one or both of the parts 12 or 14. In such case one of the stainless steel parts may be magnetized into a permanent magnet as is known in the art.

In another embodiment the slider 12 or the container 14 may be formed of ceramic type permanent magnet, suitably one sealed by impregnation and/or polymeric coating, such as a cured acrylic, epoxy, or silicone impregnant or sealant.

In still other embodiments the slider or the container or both can be molded or extruded of a polymer mixed with magnetic particles which are magnetically aligned at the time of molding or extrusion.

Of course these various alternatives may be combined. For instance a slider 12 of ceramic or extruded magnetic material may be combined with a container 14 of a suitable stainless steel or container, or vice versa, without departing from the invention hereof.

For devices intended for measuring foodstuffs, food grade materials should be used on at least all external surfaces.

The magnet should be a permanent magnet that has a Curie temperature well above the boiling point of water so that it does not become demagnetized in the course of normal cleaning operations. In embodiments where the magnet is sealing enclosed within either the container body or the slider, any magnetic material having a suitable magnetic strength, Curie temperature and stability may be used. In embodiments where the slider or the container are themselves magnetic, the material is suitably selected for these same properties and also for acceptable food contact properties.

All published documents, including all US patent documents, mentioned anywhere in this application are hereby expressly incorporated herein by reference in their entirety. Any copending patent applications, mentioned anywhere in this application are also hereby expressly incorporated herein by reference in their entirety.

The above examples and disclosure are intended to be illustrative and not exhaustive. These examples and description will suggest many variations and alternatives to one of ordinary skill in this art. All these alternatives and variations are intended to be included within the scope of the claims, where the term "comprising" means "including, but not limited to". Those familiar with the art may recognize other equivalents to the specific embodiments described herein which equivalents are also intended to be encompassed by the claims. Further, the particular features presented in the dependent claims can be combined with each other in other manners within the scope of the invention such that the invention should be recognized as also specifically directed to other embodiments having any other possible combination of the features of the dependent claims. For instance, for purposes of written description, any dependent claim which follows should be taken as alternatively written in a multiple dependent form from all claims which possess all antecedents referenced in such dependent claim.

The invention claimed is:

1. An adjustable measuring device comprising:
   an open container defining a volume and including a container channel comprising an elongated wall of a length L1, the container channel defining at least a portion of the volume of the container and having a channel shape, and
   a slider mating with the channel shape and having a length L2 shorter than L1 so that the slider can be positioned at multiple locations in the channel to define at least one measuring chamber of variable volume depending on the positioning of the slider in the channel,
   the slider and container channel being magnetically attractive to each other so that the slider attaches to the container to form a measuring assembly when the slider is fitted into the channel at one of said multiple locations, and the measuring assembly being separable for cleaning by pulling the slider from the container channel.

2. The device of claim 1 wherein the slider comprises a permanent magnet.

3. The device of claim 2 wherein said permanent magnet is permanently sealed within a chamber in the slider.

4. The device of claim 1 wherein the container comprises a ferromagnetic material.

5. The device of claim 4 wherein the container comprises sealed inner and outer walls and a bar of ferromagnetic material sealed between the inner and outer walls.

6. The device of claim 1 wherein the slider comprises a ferromagnetic material and the container comprises a ferromagnetic material.

7. The device of claim 1 wherein the slider when positioned in the container channel defines two measuring chambers.

8. The device of claim 6 wherein the two measuring chambers contain volume indicia at differing locations corresponding to different volume systems.

9. The device of claim 1 comprising measurement indicia in said container channel indicating slider locations corresponding to multiple different measurement volumes.

10. The device of claim 9 wherein said measurement indicia comprise raised lines of elastomeric material that sealingly engage the slider when the slider is magnetically attached to the container.

11. An adjustable measuring device comprising:
an open container defining a volume and including a container channel comprising an elongated wall of a length L1, the container channel defining at least a portion of the volume of the container and having a channel shape, and
a slider mating with the channel shape and having a length L2 shorter than L1 so that the slider can be positioned at multiple locations in the channel to define at least one measuring chamber of variable volume depending on the positioning of the slider in the channel, and
measurement indicia in said container channel indicating slider locations corresponding to multiple different measurement volumes, wherein
said measurement indicia comprise raised lines of elastomeric material that sealingly engage the slider when the slider is magnetically attached to the container.

12. An adjustable measuring device comprising:
an open container defining a volume and including a container channel comprising an elongated wall of a length L1, the container channel defining at least a portion of the volume of the container and having a channel shape, and
a slider mating with the channel shape and having a length L2 shorter than L1 so that the slider can be positioned at multiple locations in the channel to define a pair of measuring chambers of variable volume depending on the positioning of the slider in the channel.

13. The device of claim 12 wherein each of said pair of measuring chambers includes measurement indicia in said container channel indicating slider locations corresponding to multiple different measurement volumes, and said indicia indicate different volumes of different measurement systems between the two chambers.

14. The device of claim 13 wherein the different measurement systems comprise teaspoon and fractional teaspoon volumes in one measuring chamber and tablespoon and fractional tablespoon volumes in the other.

15. The device of claim 13 wherein the different measurement systems comprise English system volumes in one chamber and Metric system volumes in the other.

* * * * *